(12) United States Patent
Shimamura et al.

(10) Patent No.: US 8,803,893 B2
(45) Date of Patent: Aug. 12, 2014

(54) IMAGE DATA PROCESSING APPARATUS

(75) Inventors: Makoto Shimamura, Saitama (JP);
Susumu Kimura, Kawasaki (JP)

(73) Assignee: Fuji Xerox Co., Ltd., Tokyo (JP)

(*) Notice: Subject to any disclaimer, the term of this patent is extended or adjusted under 35 U.S.C. 154(b) by 902 days.

(21) Appl. No.: 12/719,042

(22) Filed: Mar. 8, 2010

(65) Prior Publication Data

US 2011/0066826 A1    Mar. 17, 2011

(30) Foreign Application Priority Data

Sep. 16, 2009 (JP) ................................. 2009-214460

(51) Int. Cl.
| | | |
|---|---|---|
| *G06F 15/16* | (2006.01) | |
| *G06F 15/80* | (2006.01) | |
| *G06T 1/20* | (2006.01) | |
| *G06F 19/00* | (2011.01) | |

(52) U.S. Cl.
USPC ........... 345/506; 345/502; 345/503; 345/504; 345/505; 700/121

(58) Field of Classification Search
USPC .................. 345/502–506; 700/121
See application file for complete search history.

(56) References Cited

U.S. PATENT DOCUMENTS

| | | | |
|---|---|---|---|
| 5,594,854 A * | 1/1997 | Baldwin et al. ............... | 345/441 |
| 6,826,674 B1 | 11/2004 | Sato | |
| 6,904,514 B1 | 6/2005 | Sato | |
| 2005/0038550 A1* | 2/2005 | Sato .............................. | 700/121 |
| 2005/0240757 A1 | 10/2005 | Sato | |
| 2005/0251358 A1* | 11/2005 | Van Dyke et al. ............ | 702/117 |

FOREIGN PATENT DOCUMENTS

| | | |
|---|---|---|
| JP | 2002-215593 A | 8/2002 |
| JP | 2004-102988 A | 4/2004 |
| JP | 2005-055976 A | 3/2005 |
| JP | 2006-040254 A | 2/2006 |
| JP | 2008-146503 A | 6/2008 |

OTHER PUBLICATIONS

Office Action dated Jul. 23, 2013, issued by the Japanese Patent Office in counterpart Japanese Application No. 2009-214460.
Office Action, dated Oct. 15, 2013, issued by the Japanese Patent Office, in counterpart Application No. 2009-214460.

* cited by examiner

*Primary Examiner* — Ke Xiao
*Assistant Examiner* — Robert Craddock
(74) *Attorney, Agent, or Firm* — Sughrue Mion, PLLC

(57) ABSTRACT

An image data processing apparatus includes: a plurality of operational processing circuits each of which is configured to have a variable circuit configuration and to execute operational processing on image data; and a control section that controls each of the operational processing circuits such that each of the operational processing circuits executes one of a plurality of types of operational processing performed on image data in a predetermined order. The control section controls each of the operational processing circuits so that when image data to be newly given to one of the operational processing circuits is interrupted, said one of the operational processing circuits and another one of the operational processing circuits execute operational processing by taking partial charge of the operational processing.

3 Claims, 12 Drawing Sheets

FIG. 7-1

| A(M1) | A(M2) | A(M3) | ... | A(Mn-1) | A(Mn) | B (DMn) | C (DMn) |

FIG. 7-2

| B(M1) | B(M2) | B(M3) | ... | B(Mn-1) | B (DMn) | C (DMn) |

FIG. 7-3

| C(M1) | C(M2) | C(M3) | ... | C(Mn-1) |

IMAGE DATA PROCESSING APPARATUS

CROSS-REFERENCE TO RELATED APPLICATIONS

This application is based on and claims priority under 35 USC 119 from Japanese Patent Application No. 2009-214460 filed on Sep. 16, 2009.

BACKGROUND

1. Technical Field

The present invention relates to an image data processing apparatus.

2. Related Art

There are widely used systems in each of which image data is transmitted from a computer to a printer that prints images. Some computers used in such systems execute image data processing based on software, and cause image data processing hardware devices to execute processing.

The image data processing hardware devices include a specific purpose device whose circuit configuration is fixed, a reconfigurable device whose circuit configuration is variable by reading data, and the like. Dynamically reconfigurable devices have widely been studied. The dynamically reconfigurable device is a device that can change its own circuit configuration during execution of operational processing.

Image data processing can include a plurality of types of processing, such as a resolution conversion and an image rotation. In some hardware configuration for executing image data processing that includes a plurality of types of processing, a plurality of hardware devices respectively executing predetermined types of processing are cascade-connected. In this configuration, the hardware device in a precedent stage gives processed image data to that in a subsequent stage. The hardware device in the subsequent stage executes processing on the image data. The hardware device in the last stage outputs an image subjected to a plurality of types of processing.

SUMMARY

According to an aspect of the invention, an image data processing apparatus includes: a plurality of operational processing circuits each of which is configured to have a variable circuit configuration and to execute operational processing on image data; and a control section that controls each of the operational processing circuits such that each of the operational processing circuits executes one of a plurality of types of operational processing performed on image data in a predetermined order. The control section controls one of the operational processing circuits which executes a precedent type of the operational processing being executed earlier in the predetermined order, gives image data executed by said one of the operational processing circuits to another one of the operational processing circuits which executes a subsequent type of the operational processing being executed later in the predetermined order. The control section performs a pipeline control operation so that while one of the operational processing circuits assigned to the subsequent type of the operational processing executes the subsequent type thereof, another one of the operational processing circuits assigned to the precedent type of the operational processing executes operational processing on image data newly given thereto. The control section controls each of the operational processing circuits so that when image data to be newly given to one of the operational processing circuits is interrupted, said one of the operational processing circuits and another one of the operational processing circuits execute operational processing by taking partial charge of the operational processing.

BRIEF DESCRIPTION OF THE DRAWINGS

Exemplary embodiment(s) of the present invention will be described in detail based on the following figures, wherein:

FIGS. 7-1 to 7-3 are processing diagrams each illustrating a process of performing pre-combination image data processing according to the first example on photograph image data;

FIGS. 9-1 to 9-3 are processing diagrams each illustrating a process of performing pre-combination image data processing according to the second example on photograph image data;

FIGS. 11-1 to 11-3 are processing diagrams each illustrating a process of performing pre-combination image data processing according to the third example on photograph image data.

DETAILED DESCRIPTION

1. Printing System

Figure 1:
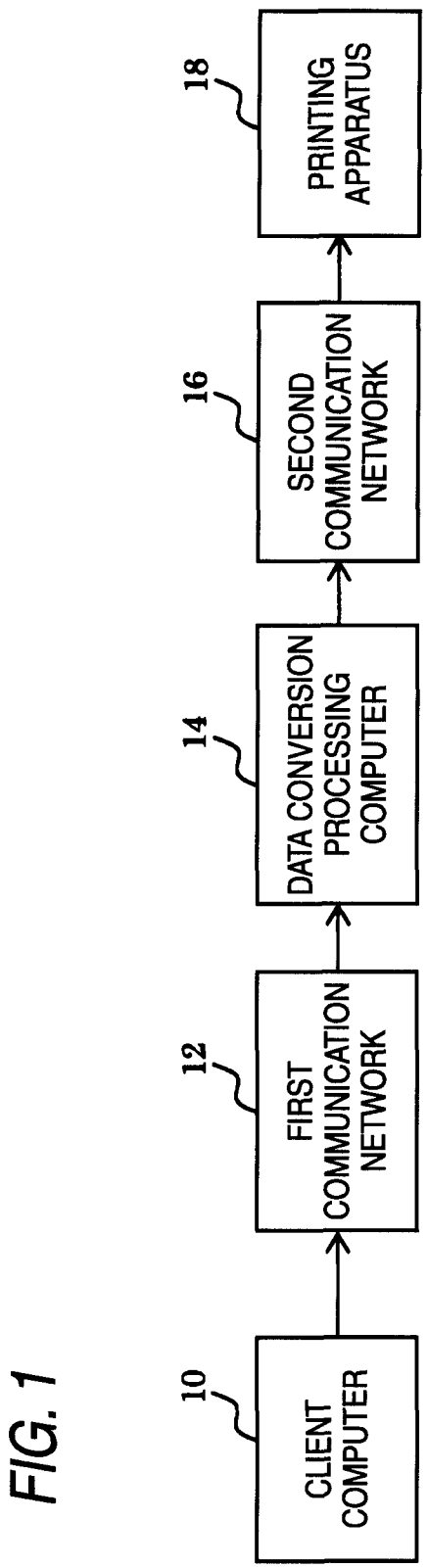
FIG. 1 is a diagram illustrating an example of the configuration of a printing system according to an exemplary embodiment of the invention.

FIG. 1 illustrates an example of the configuration of a printing system according to an exemplary embodiment of the invention. A client computer 10 and a data conversion processing computer 14 are connected to each other by a first communication network 12. The data conversion processing computer 14 and a printing apparatus 18 are connected to each other by a second communication network 16. Local area networks can be used as the first communication network 12 and the second communication network 16. The first communication network 12 and the second communication network 16 can be used as common communication networks. Alternatively, the client computer 10 or the printing apparatus 18 can be connected directly to the data conversion processing computer 14 via no network.

In this system, print target data to be printed is transmitted from the client computer 10 to the printing apparatus 18 which prints an image. The client computer 10 transmits print target data described in a page description language to the data conversion processing computer 14 via the first communication network 12. The page description language is a computer programming language for causing an information processing apparatus to execute display indication processing, print processing, and the like.

The data conversion processing computer 14 converts print target data into image data representing a color and position coordinates of each pixel. Then, the data conversion processing computer 14 transmits the image data to the printing apparatus 18 via the second communication network 16. The printing apparatus 18 executes printing processing on the image data received from the second communication network 16.

2. Data Conversion Processing Computer

Figure 2:
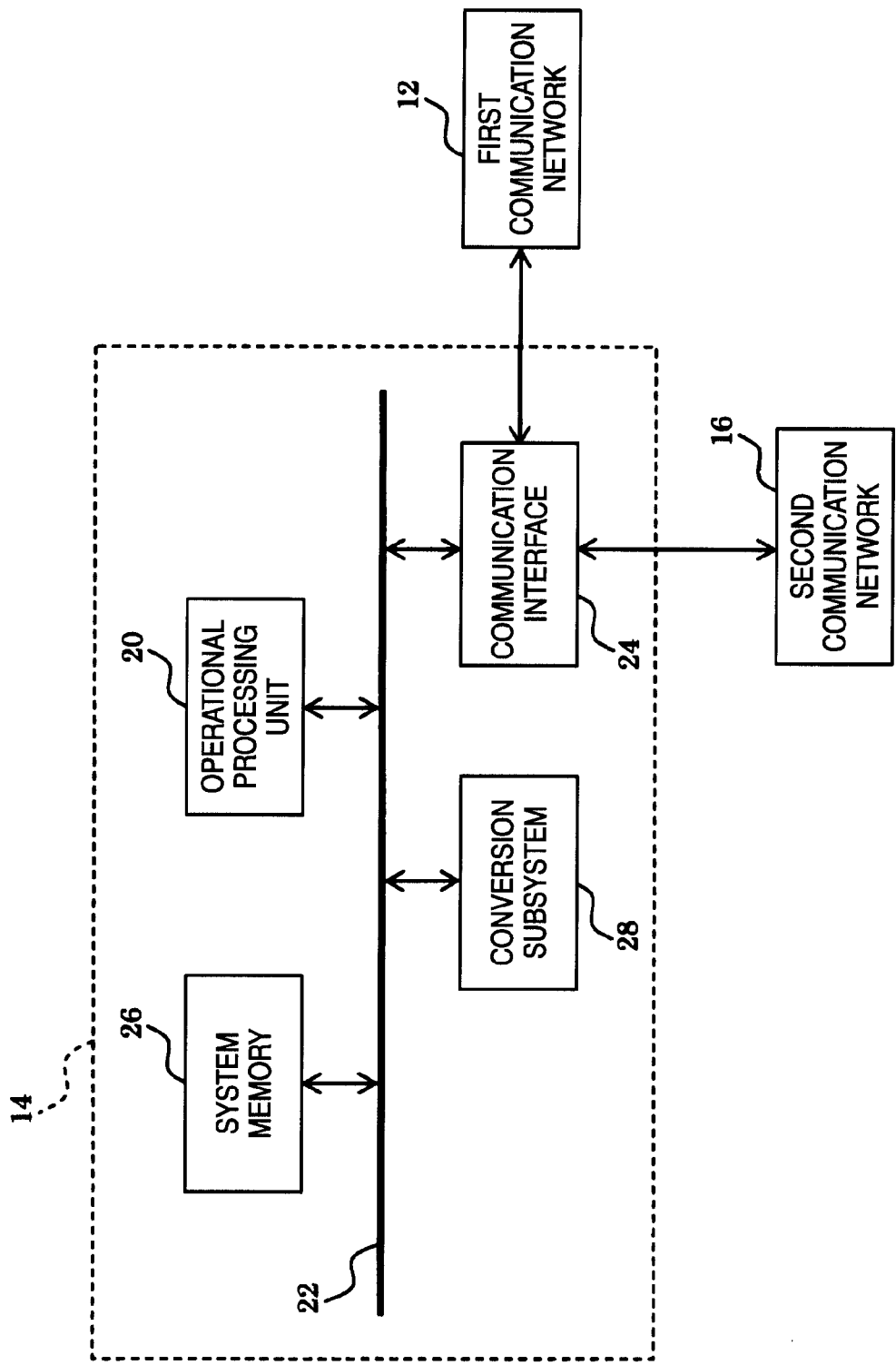
FIG. 2 is a diagram illustrating an example of the hardware configuration of a data conversion processing computer.

The data conversion processing computer 14 constituting the printing system is described hereinafter. FIG. 2 illustrates an example of the hardware configuration of the data conversion processing computer 14. Each device provided in the data conversion processing computer 14 is connected to a data bus 22 for transmitting and receiving to and from the operational processing unit 20. The operational processing unit 20 executes operational processing on information acquired from the data bus 22 according to a program stored in a system memory 26.

Figure 3:
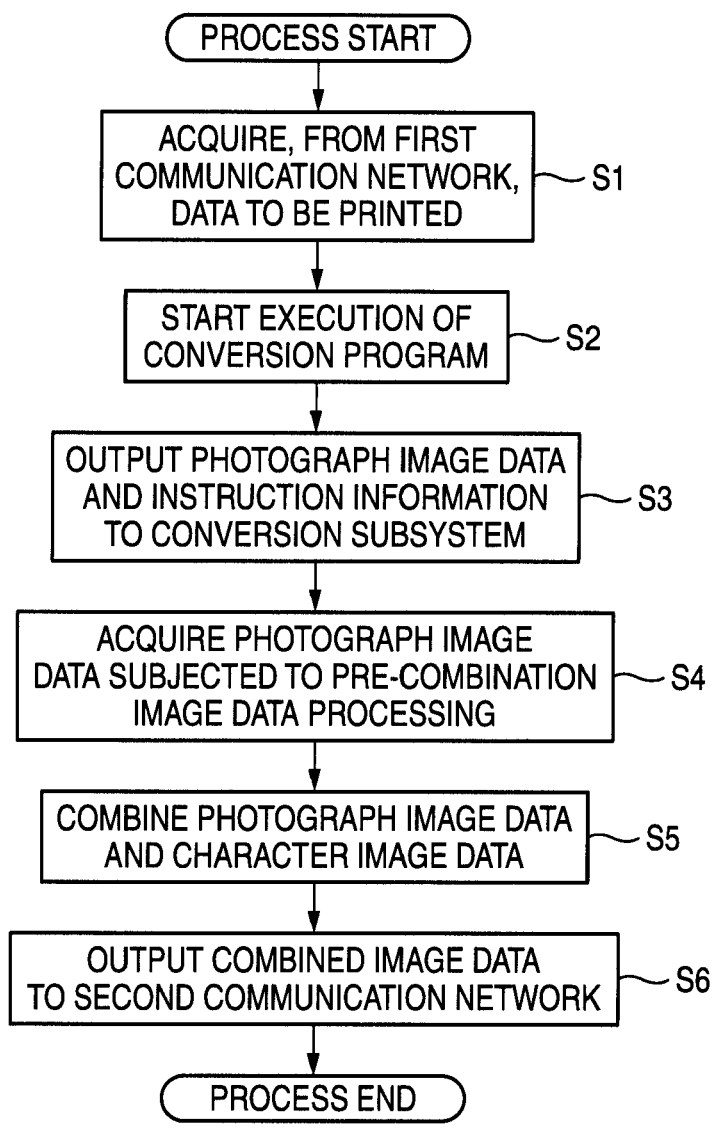
FIG. 3 is a flowchart illustrating processing to be executed by an operational processing unit.

FIG. 3 shows a flowchart illustrating a process to be performed by the operational processing unit 20. In step S1, the operational processing unit 20 acquires print target data from the first communication network 12 via the communication interface 24 and causes the system memory 26 to store the print target data.

The system memory 26 stores a conversion program. The conversion program is a program for causing the operational processing unit 20 to execute processing to convert data described in a page description language into image data. In step S2, the operational unit 20 executes the conversion program to convert print target data stored in the system memory 26 into image data.

Generally, processing to convert information described in a page description language into image data is usually facilitated by being performed individually on such a type of information representing a character image and such a type of information representing a photograph image by respectively applying different methods thereto. Thus, the conversion program causes the operational processing unit 20 to perform a process of individually executing processing on the information representing a character image and a different type of processing on the information representing a photograph image, and combining processed image data respectively obtained by the different types of processing.

Photograph image data based on information representing a photograph image can be subjected to a plurality of types of processing, such as resolution conversion processing and rotation processing, before the combination between the photograph image data and the character image data is performed. A processing time obtained by causing a dedicated hardware device to execute such a plurality of types of processing is usually shorter than that obtained by causing the operational processing unit 20 to execute such a plurality of types of processing based on the program. Thus, the data conversion processing computer 14 can cause a conversion subsystem 28 to execute pre-combination image data processing on photograph image data before the combination of the photograph image data and character image data is performed.

In step S3, the operational processing unit 20 outputs, to the conversion subsystem 28, photograph image data generated in the process of executing the conversion program, and instruction information indicating that the pre-combination image data processing is performed on photograph image data. At that time, in order to adjust the timing at which processing is executed by the conversion subsystem 28, the operational processing unit 20 can output photograph image data to the conversion subsystem 28 after the photograph image data is stored in the system memory 26.

The conversion subsystem 28 performs the pre-combination image data processing on the photograph image data, based on the instruction information, and outputs resultant data to the operational processing unit 20. In step S4, the operational processing unit 20 acquires, from the conversion subsystem 28, photograph image data subjected to the pre-combination image data processing. Then, in step S5, the operational processing unit 20 combines the photograph image data and the character image data output from the conversion subsystem 28. In step S6, the operational processing unit 20 outputs combined image data to the second communication network 16 via the communication interface 24.

3. Conversion Subsystem (1) Hardware Configuration

Figure 4:
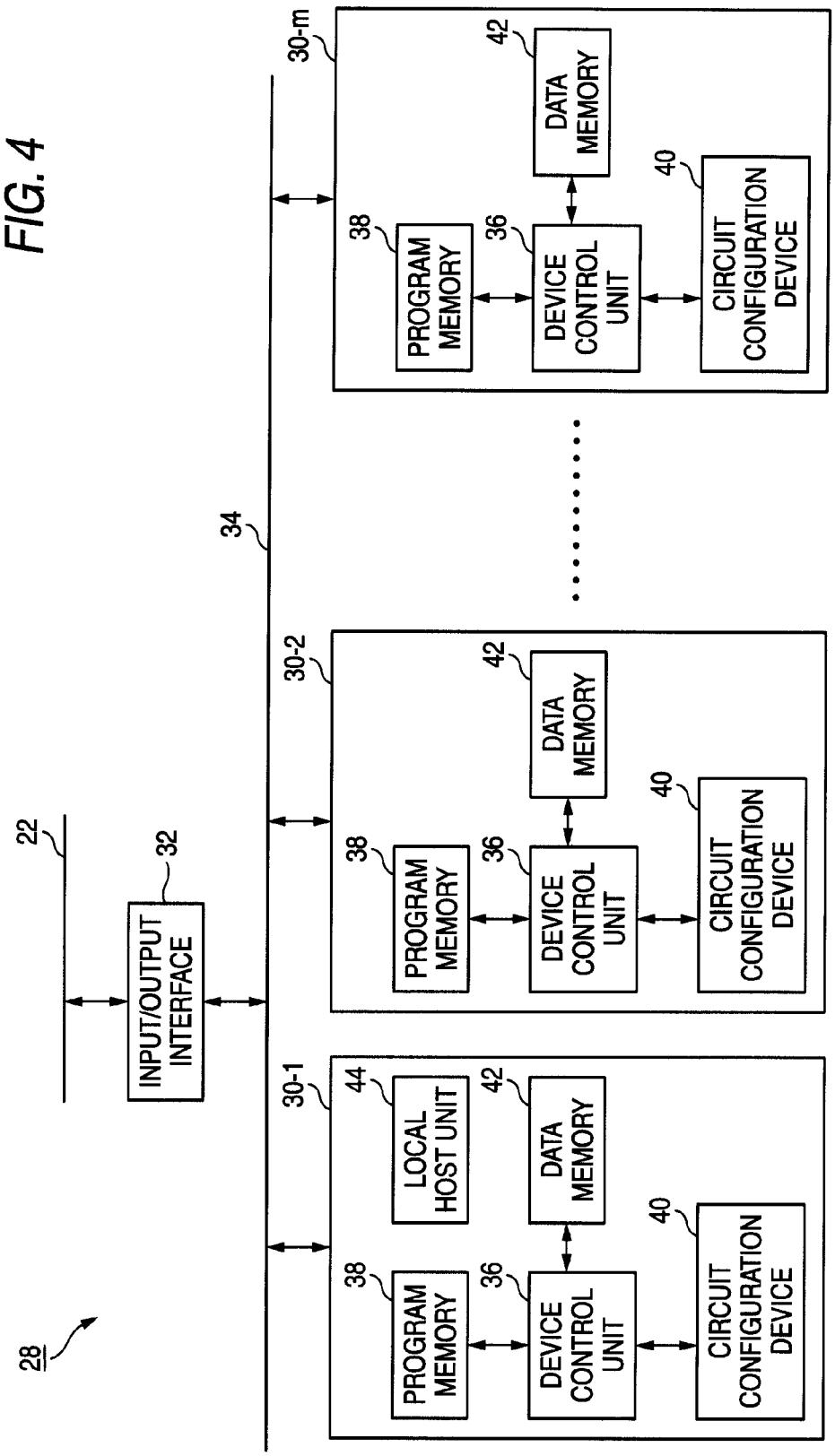
FIG. 4 is a diagram illustrating an example of the hardware configuration of a conversion subsystem.

FIG. 4 illustrates an example of the hardware configuration of the conversion subsystem 28. The conversion subsystem 28 includes a plurality of dynamically reconfigurable processors 30-1 to 30-$m$. Each of the plurality of dynamically reconfigurable processors enables that a plurality of types of circuits can be configured by a single device. The conversion subsystem 28 can employ dynamically reconfigurable processors the number of which corresponds to the number of types of processing to be performed therein.

Each of the dynamically reconfigurable processors includes a device control unit 36 which controls an operation thereof, a program memory 38 which stores programs to be executed by the device control unit 36, a circuit configuring device 40 which configures a plurality of types of circuits under the control of the device control unit 36, and a data memory 42 which stores data generated in the process of executing the program.

The program memory 38 stores a circuit configuration program for causing the device control unit 36 to execute processing to implement a circuit configuration. The device control unit 36 configures, in the circuit configuring device 40, a circuit defined by the circuit configuring program.

The dynamically reconfigurable processors 30-1 to 30-$m$ are connected to a local data bus 34. Data transfer is mutually performed among the dynamically reconfigurable processors 30-1 to 30-$m$ via the local data bus 34. Each of the dynamically reconfigurable processors can perform, at the transfer of data, a process of causing the data memory 42 to store transfer target data to be transferred and reading the transfer target data therefrom in order to adjust timing thereof.

The conversion subsystem 28 includes a local host unit 44 which controls an operation of each of the dynamically reconfigurable processors 30-1 to 30-$m$. The local host unit 44 can be constituted in any of the dynamically reconfigurable processors 30-1 to 30-$m$. Alternatively, the local host unit 44 can be configured as hardware provided separately from the dynamically reconfigurable processors 30-1 to 30-$m$. When the local host unit 44 is configured in one of the dynamically reconfigurable processors, the local host unit 44 can be configured in the device control unit 36.

According to the control of the local host unit 44, one of the dynamically reconfigurable processors 30-1 to 30-$m$ acquires, from the data bus 22 via an input/output interface 32, processing target data to be processed. In the dynamically reconfigurable processors 30-1 to 30-$m$, the acquired data processing is performed according to the control of the local host unit 44 and the processed data is output to the data bus 22 via the input/output interface 32.

(2) Pre-Combination Image Data Processing
(a) First Example

An example of the pre-combination image data processing is described hereinafter, which includes three types of data processing and uses three dynamically reconfigurable processors 30-1 to 30-m. In this case, it is assumed that the dynamically reconfigurable processor 30-1 includes the local host unit 44. In the following description, the three types of data processing are described as processing A, processing B, and processing C. The three types of data processing can be resolution conversion processing for converting the resolution of an image, rotation processing for changing the direction of an image, filtering processing for adjusting the contribution of a predetermined data component included in image data to an image represented by the image data, compression processing for reducing an information amount of image data, screening processing for adjusting the roughness of dots of color components of an image, or the like.

Figure 5:
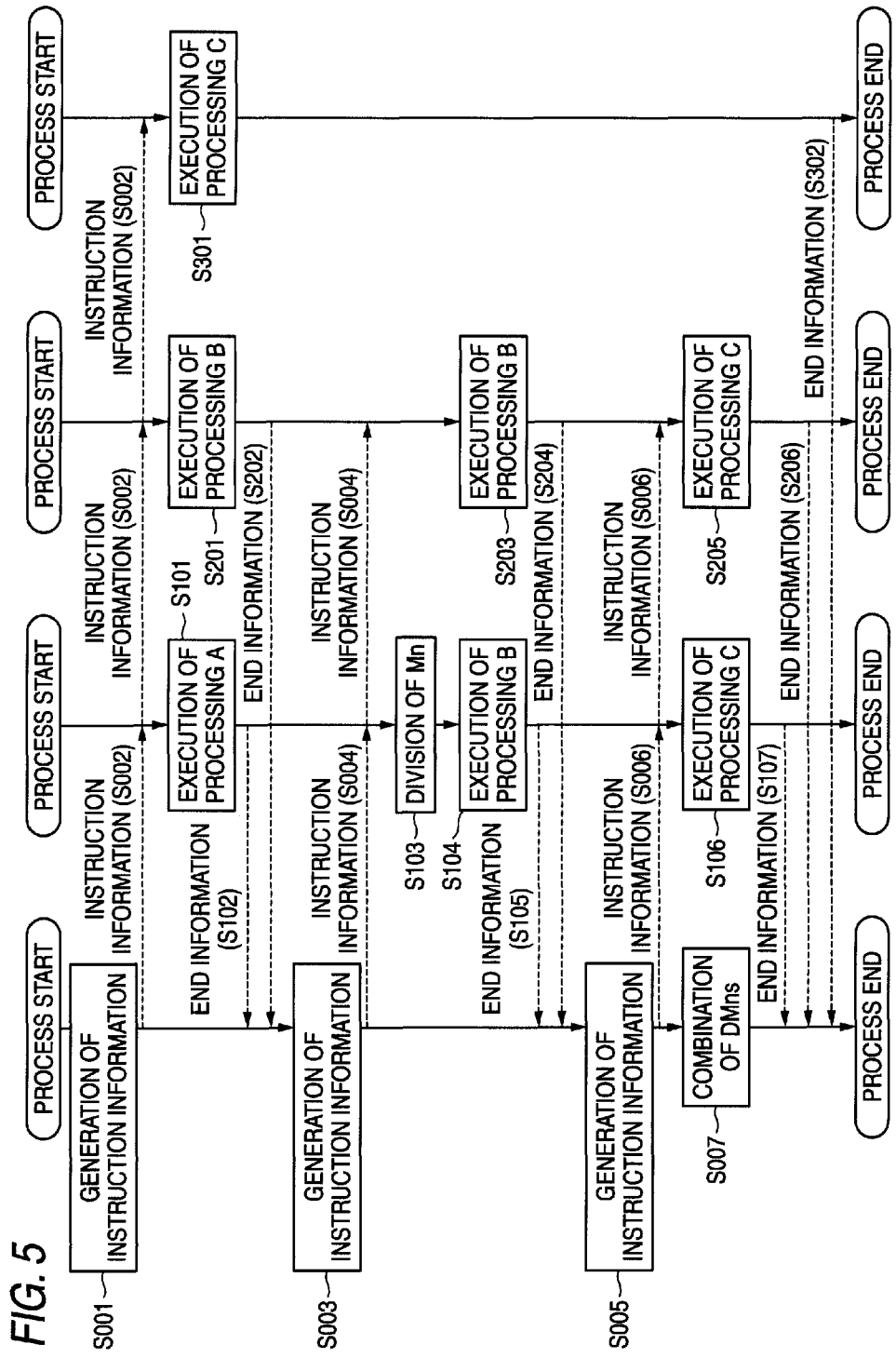
FIG. 5 is a sequence diagram illustrating pre-combination image data processing according to a first example of the invention.

FIG. 5 shows a sequence diagram illustrating pre-combination image data processing according to the first example. Processing in steps designated by reference numerals of S000s in FIG. 5 is that to be performed by the local host unit 44. Processing insteps designated by reference numerals of S100s, that in steps designated by reference numerals of S200s, and that in steps designated by reference numerals of S300s correspond to that to be executed by the dynamically reconfigurable processor 30-1, that to be executed by the dynamically reconfigurable processor 30-2, and that to be executed by the dynamically reconfigurable processor 30-3, respectively.

Figure 6:
FIG. 6 is a diagram illustrating the structure of a photograph image data.

The operational processing unit 20 outputs, e.g., photograph image data PD having a structure illustrated in FIG. 6 to the conversion subsystem 28. The photograph image data PD includes processing-unit data-elements M1 to Mn. Processing to be executed by the dynamically reconfigurable processor is performed on a single processing-unit data-element as a single independent process. In this case, it is assumed that a time required to perform processing A on each processing-unit data-element, a time required to perform processing B on each processing-unit data-element, and a time required to perform processing C on each processing-unit data-element are uniform.

FIGS. 7-1 to 7-3 show processing diagrams each illustrating a process of performing pre-combination image data processing according to the first example on photograph image data PD illustrated in FIG. 6. More specifically, FIGS. 7-1 to 7-3 show the processing diagrams illustrating the processes performed by the dynamically reconfigurable processors 30-1 to 30-3, respectively. In FIGS. 7-1 to 7-3, fields designated by reference numerals such as "A(Mi)" (i=1, 2, . . . , and n) represent time zones in each of which the processing (e.g., the processing A) is performed on the processing-unit data (e.g., Mi). Hereinafter, the pre-combination image data processing according to the first example is described with reference to FIGS. 4 to 7-3.

When acquiring from the operational processing unit 20 instruction information indicating that the pre-combination image data processing is to be executed, the local host unit 44 provided in the dynamically reconfigurable processor 30-1 indicates processing to be performed by each dynamically reconfigurable processor. That is, in step S001, the local host unit 44 generates instruction information defining the contents of processing to be performed by each dynamically reconfigurable processor. In step S002, the local host unit 44 notifies each dynamically reconfigurable processor of the instruction information.

The device control unit 36 provided in the dynamically reconfigurable processor 30-1 reads, from the program memory 38 provided therein, a program for configuring an A-processing circuit which executes processing A, according to the instruction information. Thus, the device control unit 36 configures the A-processing circuit in the circuit configuring device 40. Then, in step S101, the device control unit 36 causes the A-processing circuit to sequentially execute the processing A on processing-unit data-elements M1 to Mn.

The A-processing circuit transfers, to the dynamically reconfigurable processor 30-2, the processing-unit data-elements M1 to Mn-1 processed by performing the processing A, among the processing-unit data-elements M1 to Mn. On the other hand, regarding the processing-unit data-element Mn processed by executing the processing A, as will be described below, the A-processing circuit transfers divided parts of the processed processing-unit data-element Mn to destinations respectively corresponding to the dynamically reconfigurable processors 30-1 and 30-2 which take partial charge of the processing. The A-processing circuit executes the processing A sequentially on the processing-unit data-elements and transfers the processing-unit elements processed by performing the processing A. While the dynamically reconfigurable processor serving as the destination, to which the data obtained corresponding to each of the processing-unit data-elements is transferred, performs associated processing on the transferred data, the A-processing circuit executes the processing A on the next processing-unit data-element.

The device control unit 36 provided in the dynamically reconfigurable processor 30-2 reads, from the program memory 38 provided therein a program for configuring a B-processing circuit which executes processing B, according to the instruction information. Thus, the device control unit 36 configures the B-processing circuit in the circuit configuring device 40 provided therein. Then, in step S201, the device control unit 36 causes the B-processing circuit to execute the processing B on each of processing-unit data-elements M1 to Mn-1 transferred from the dynamically reconfigurable processor 30-1.

The B-processing circuit executes the processing B on each processing-unit data-element and transfers processed processing-unit data-element to the dynamically reconfigurable processor 30-3. While the dynamically reconfigurable processor 30-3 executes associated processing on the processing-unit data-element transferred thereto, the B-processing circuit executes the processing B on the next processing-unit data-element.

The device control unit 36 provided in the dynamically reconfigurable processor 30-3 reads, from the program memory 38 provided therein a program for configuring a C-processing circuit which executes processing C, according to the instruction information. Thus, the device control unit 36 configures the C-processing circuit in the circuit configuring device 40 provided therein. Then, in step S301, the device control unit 36 causes the C-processing circuit to perform processing C on the processing-unit data-elements M1 to Mn-1 transferred thereto from the dynamically reconfigurable processor 30-2. The C-processing circuit executes processing C on each processing-unit data-element and transfers the processed processing-unit data-element to the local host unit 44 provided therein. While the local host unit 44 executes the processing on the processing-unit data-element, the C-processing circuit executes processing on the next processing-unit data-element. The local host unit 44 outputs to the operational processing unit 20 the processing-unit data-elements M1 to Mn-1 on which the processing C is performed.

In this process, in a time-period since the local host unit 44 starts processing in step S001 and until the local host unit 44 receives notifications of end information in steps S102 and S202, processing is performed, which corresponds to each of fields A(M1) to A(Mn) illustrated in FIG. 7-1, fields B(M1) to B(Mn-1) illustrated in FIG. 7-2, and fields C(M1) to C(Mn-2) illustrated in FIG. 7-3.

According to such a pipeline process, the processing A, the processing B, and the processing C are performed on the processing-unit data-elements M1 to Mn-1 of the photograph image data PD in this order. Processed data is output to the operational processing unit 20. As described above, while the dynamically reconfigurable processor in a subsequent stage executes processing, the dynamically reconfigurable processor in a precedent stage executes processing on a processing-unit data-element newly given thereto.

When the processing A performed on the processing-unit data-elements M1 to Mn is ended, in step S102, the device control unit 36 provided in the dynamically reconfigurable processor 30-1 notifies the local host unit 44 of end information indicating that the processing A to be performed on the processing-unit data-elements M1 to Mn-1 is ended. Upon completion of the processing B on the processing-unit data-element M1 to Mn-1, in step S202, the device control unit 36 provided in the dynamically reconfigurable processor 30-2 notifies the local host unit 44 of end information indicating that the processing B on the processing-unit data-elements M1 to Mn-1 is ended.

When receiving the end information, the local host unit 44 causes the dynamically reconfigurable processors 30-1 and 30-2 to execute processing B on the processing-unit data Mn, on which processing A is executed by the dynamically reconfigurable processor 30-1, by taking partial charge of the processing B. That is, in step S003, the local host unit 44 generates instruction information to cause the dynamically reconfigurable processors to take partial charge of the processing B. In step S004, the local host unit 44 notifies the dynamically reconfigurable processors 30-1 and 30-2 of this instruction information.

When receiving a notification representing the instruction information, the dynamically reconfigurable processors 30-1 and 30-2 perform, e.g., the following process. In step S103, the device control unit 36 provided in the dynamically reconfigurable processor 30-1 divides the processing-unit data-element Mn, on which the processing A is performed, into two processing-unit data-elements DMn. The device control unit 36 transfers one of the divided processing-unit data-elements DMn to the dynamically reconfigurable processor 30-2. In step S104, the device control unit 36 configures the B-processing circuit in the circuit configuring device 40 and causes the B-processing circuit to execute the processing B on the other of the divided processing-unit data-elements DMn.

In step S203, the device control unit 36 provided in the dynamically reconfigurable processor 30-2 causes the B-processing circuit configured in step S201 to execute processing B on the processing-unit data-element DMn transferred from the dynamically reconfigurable processor 30-1.

Upon completion of the processing B on one of the processing-unit data-elements DMn, in step S105, the device control unit 36 provided in the dynamically reconfigurable processor 30-1 notifies the local host unit 44 of end information indicating the completion of the processing B. Similarly, upon completion of the processing B on the other of the processing-unit data-elements DMn, in step S204, the device control unit 36 provided in the dynamically reconfigurable processor 30-2 notifies the local host unit 44 of end information indicating the completion of the processing B on the other element DMn.

When receiving each of the notifications representing the end information, in step S005, the local host unit 44 generates end information indicating that processing C should be continued to be performed on each of the processing-unit data-elements DMn on which the processing B is executed. In step S006, the local host unit 44 notifies the dynamically reconfigurable processors 30-1 and 30-2 of this end information.

When receiving notifications representing this end information, the dynamically reconfigurable processors 30-1 and 30-2 execute processing C, e.g., in the following manner. In step S106, the dynamically reconfigurable processor 30-1 configures a C-processing circuit in the circuit configuring device 40. In step S106, the dynamically reconfigurable processor 30-1 causes the C-processing circuit to execute processing C on the processing-unit data-element DMn on which the processing B is performed in step S104.

Similarly, in step S205, the dynamically reconfigurable processor 30-2 configures a C-processing circuit in the circuit configuring device 40 provided therein. Then, the dynamically reconfigurable processor 30-2 causes this C-processing circuit to execute processing C on the processing-unit data-element DMn on which the processing B is performed in step S203. The C-processing circuit provided in each of the dynamically reconfigurable processors 30-1 and 30-2 transfers the processing-unit data-element, on which the processing C is performed, to the local host unit 44.

In step S007, the local host unit 44 generates a single processing-unit data-element Mn by combining the processing-unit data-elements DMn respectively transferred from the C-processing circuits. Then, the local host unit 44 outputs the processing-unit data-element Mn to the operational processing unit 20.

Upon completion of processing according to the instruction information notified in step S006, which indicates that the processing C should be performed on the processing-unit data-element DMn, in steps S107 and S206, the dynamically reconfigurable processors 30-1 and 30-2 notify the local host unit 44 of end information. Upon completion of processing according to the instruction information notified in step S002, which indicates that the processing C should be performed on the processing-unit data-elements M1 to Mn-1, in steps S302, the dynamically reconfigurable processor 30-3 notifies the local host unit 44 of end information. When receiving each of such notifications representing the end information, the local host unit 44 ends the pre-combination image data processing.

In this process, in a time-period since the local host unit 44 starts processing in step S003 and until the local host unit 44 receives the notifications of end information in steps S107, S206 and S302, processing is performed, which corresponds to each of fields B(DMn) and C(Mn) illustrated in FIG. 7-1, fields B(DMn) to C(DMn) illustrated in FIG. 7-2, and a field C(Mn-1) illustrated in FIG. 7-3. Processing B and processing C are performed on the processing-unit data-element Mn, on which the processing A is performed in step S101, in this order. Processed data is output to the operational processing unit 20.

Both the dynamically reconfigurable processors 30-1 and 30-2 execute processing B and processing C in sequence on the processing-unit data-element Mn by taking partial charge of each of the processing B and the processing C while the dynamically reconfigurable processor 30-3 performs processing C on the processing-unit data-element Mn-1. Consequently, a processing time can be reduced, as compared with a case where the dynamically reconfigurable processor 30-2 singly performs processing B on the processing-unit data-element Mn, and subsequently, the dynamically reconfigurable processor 30-3 singly performs processing C on the processing-unit data Mn.

(b) Second Example

Figure 8:
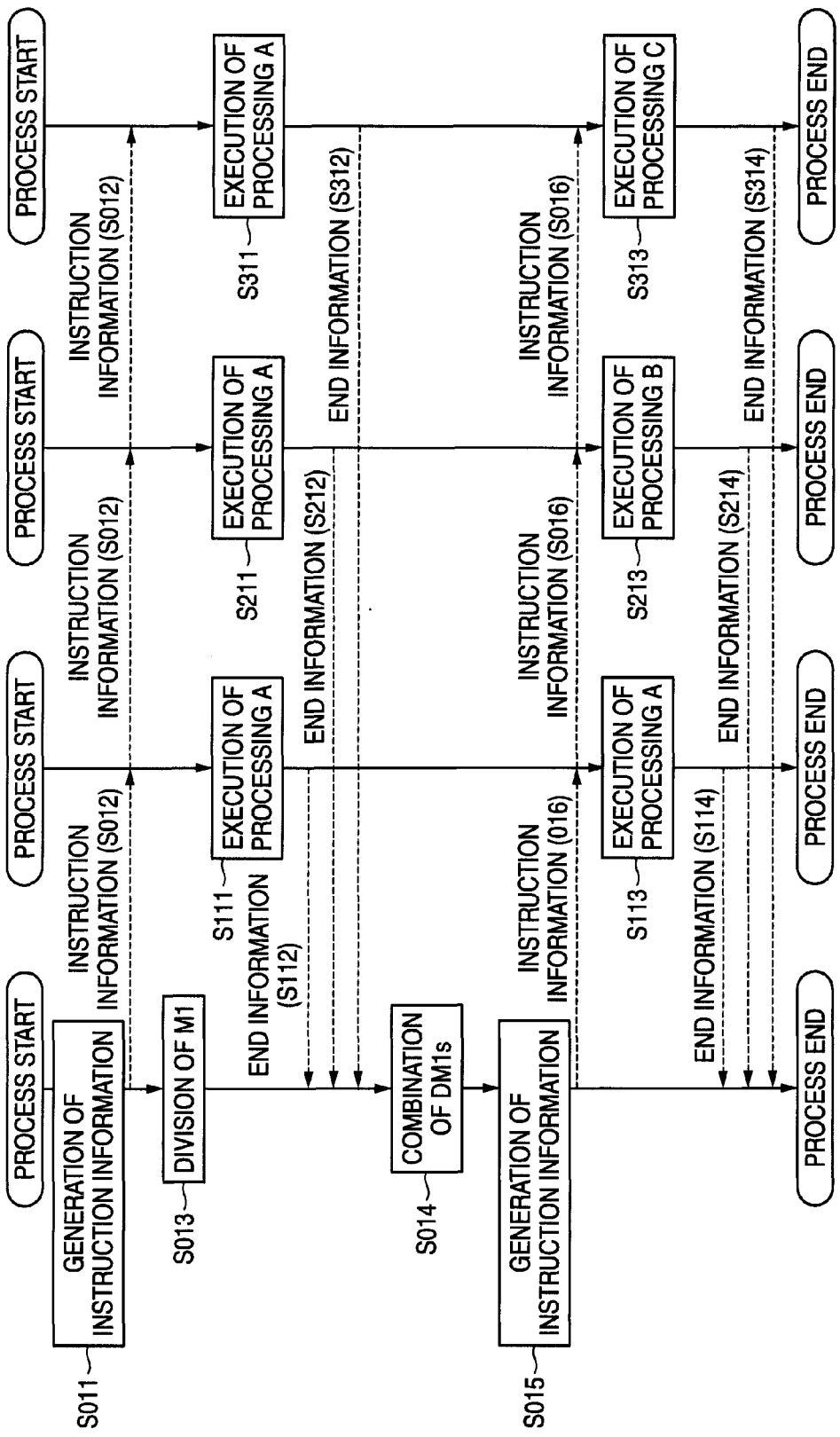
FIG. 8 is a sequence diagram illustrating pre-combination image data processing according to a second example.

FIG. 8 is a sequence diagram illustrating pre-combination image data processing according to a second example. Processing in steps designated by reference numerals of S000s in FIG. 8 is that to be performed by the local host unit 44. Processing in steps designated by reference numerals of S100s, that in steps designated by reference numerals of S200s, and that in steps designated by reference numerals of S300s correspond to that to be executed by the dynamically reconfigurable processor 30-1, that to be executed by the dynamically reconfigurable processor 30-2, and that to be executed by the dynamically reconfigurable processor 30-3, respectively.

Figures 1, 9:
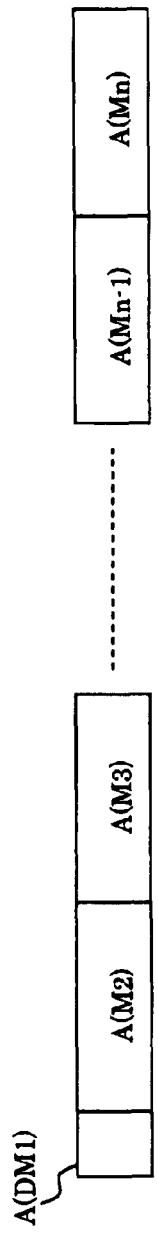
Figures 2, 9:
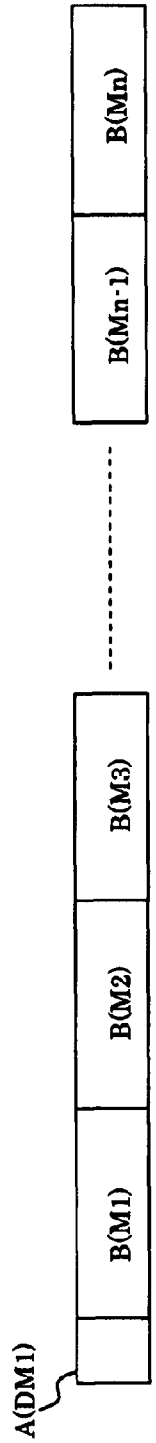
Figures 3, 9:
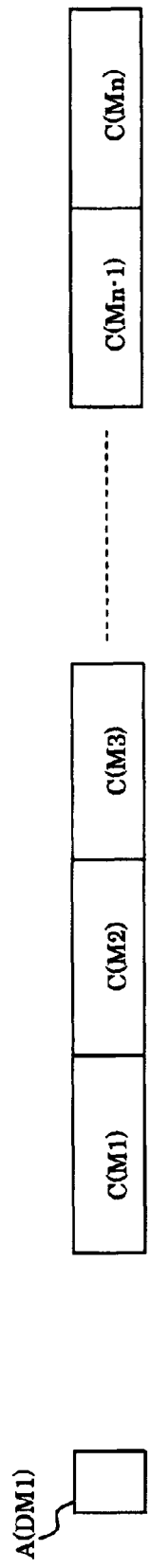

FIGS. 9-1 to 9-3 show processing diagrams for illustrating the second example. FIGS. 9-1 to 9-3 show processing diagrams illustrating processes performed by the dynamically reconfigurable processors 30-1 to 30-3, respectively. Hereinafter, the pre-combination image data processing according to the second example is described with reference to FIGS. 4, 8 and 9-1 to 9-3.

When receiving from the operational processing unit 20 instruction information indicating that the pre-combination image data processing is executed, the local host unit 44 causes the dynamically reconfigurable processors 30-1 to 30-3 to execute processing A on processing-unit data-element M1 by taking partial charge of the processing A. That is, in step S011, the local host unit 44 generates instruction information indicating that the dynamically reconfigurable processors should execute processing A by taking partial charge of the processing A. In step S012, the local host unit 44 notifies the dynamically reconfigurable processors 30-1 to 30-3 of the instruction information.

When receiving notifications representing the instruction information, the dynamically reconfigurable processors 30-1 to 30-3 execute, e.g., the following process. In step S013, the local host unit 44 divides the processing-unit data-element M1 output from the operational processing unit 20 into three processing-unit data-elements DM1. The three processing-unit data-elements DM1 are transferred to the dynamically reconfigurable processors 30-1 to 30-3, respectively. Insteps S111, S211 and S311, the device control unit 36 provided in each of the dynamically reconfiguration processors 30-1 to 30-3 configures an A-processing configuring device 40 and causes the A-processing circuit to perform processing A on the processing-unit data-element DM1 transferred from the local host unit 44. The A-processing circuit provided in each of the dynamically reconfigurable processors 30-1 to 30-3 transfers the processing-unit data-element DM1, on which the processing A is performed, to the local host unit 44. Upon completion of the processing by the A-processing circuit, in steps S112, S212 and S312, the A-processing circuits notify the local host unit 44 of end information.

When receiving notifications representing the end information, in step S014, the local host unit 44 generates a single processing-unit data-element M1 by combining the processing-unit data-elements DM1 transferred from the A-processing circuits. The local host unit 44 transfers the processing-unit data-element M1 to the dynamically reconfigurable processor 30-2.

In this process, in a time-period since the local host unit 44 starts processing in step S011 and until the local host unit 44 receives a notification representing end information in step S104, processing is performed, which corresponds to each of fields A(DM1) illustrated in FIGS. 9-1 to 9-3. The dynamically reconfigurable processors 30-1 to 30-3 perform processing A on the processing-unit data-element M1 by taking partial charge of the processing A. Consequently, similarly to the first example, a time required to execute the processing A, as compared with a case where the dynamically reconfigurable processor 30-1 singly performs processing A on the processing-unit data-element M1.

When receiving the notifications representing the end information, in step S015, the local host unit 44 generates instruction information indicating that pipeline processing on the processing-unit data-elements M1 to Mn should be continued to be performed. In step S016, the local host unit 44 notifies each of the dynamically reconfigurable processors 30-1 to 30-3 of the instruction information.

In step S113, the device control unit 36 provided in the dynamically reconfigurable processor 30-1 causes, according to the instruction information, the A-processing circuit configured in step S111 to execute processing A on the processing-unit data-elements M2 to Mn. The A-processing circuit performs processing A on each processing-unit data-element and transfers the processed processing-unit data-element to the dynamically reconfigurable processor 30-2. Then, the A-processing circuit executes processing A on the next processing-unit data-element while the dynamically reconfigurable processor 30-2 performs processing on the processing-unit data-element transferred thereto.

The device control unit 36 provided in the dynamically reconfigurable processor 30-2 configures, according to the instruction information, the B-processing circuit in the circuit configuring device 40 provided therein. In step S213, the device control unit 36 causes the B-processing circuit to perform processing B on the processing-unit data-elements M1 to Mn transferred from the dynamically reconfigurable processor 30-1. The B-processing performs processing B on each processing-unit data-element and transfers the processed processing-unit data-element to the dynamically reconfigurable processor 30-3. Then, the B-processing circuit executes processing B on the next processing-unit data-element while the dynamically reconfigurable processor 30-3 performs processing on the processing-unit data-element transferred thereto.

The device control unit 36 provided in the dynamically reconfigurable processor 30-3 configures, according to the instruction information, a C-processing circuit in the circuit configuring device 40 provided therein. In step S313, the device control unit 36 causes the C-processing circuit to perform processing C on the processing-unit data-elements M1 to Mn transferred from the dynamically reconfigurable processor 30-2. The C-processing performs processing C on each processing-unit data-element and transfers the processed processing-unit data-element to the local host unit 44. Then, the C-processing circuit executes processing on the next processing-unit data-element while the local host unit 44 performs processing on the processing-unit data-element transferred thereto. The local host unit 44 outputs the processing-unit data-elements M1 to Mn, on which the processing C is performed, to the operational processing unit 20.

Upon completion of processing according to the instruction information indicating that the pipeline processing should be performed, in steps S114, S214 and S314, the dynamically reconfigurable processors 30-1 to 30-3 notify the local host unit 44 of end information. When receiving notifications representing the end information, the local host unit 44 ends the pre-combination image data processing.

In this process, in a time-period since the local host unit 44 starts processing in step S015 and until the local host unit 44 receives the notifications representing end information in steps S114, S214 and S314, processing is performed, which corresponds to each of fields A(M2) and A(Mn) illustrated in FIG. 9-1, fields B(M1) to B(Mn) illustrated in FIG. 9-2, and fields C(M1) to C(Mn) illustrated in FIG. 9-3.

According to such pipeline processing, processing A, processing B, and processing C are performed on the processing-unit data-elements M1 to Mn in this order. Processed data is output to the operational processing unit 20. As described above, while the dynamic reconfigurable processor performs processing in a subsequent stage, the dynamic reconfigurable processor performs processing on a newly given processing-unit data-element.

The process according to the second example can be combined with that according to the first example. In this case, while the dynamically reconfigurable processor 30-3 performs processing C on the processing-unit data-element Mn-1, the dynamically reconfigurable processors 30-1 and 30-2 execute processing B and processing C on the processing-unit data-element DMn in this order by taking partial charge of each of the processing B and the processing C. That is, the dynamically reconfigurable processors 30-1 and 30-2 execute processing B and processing C on the processing-unit data-element DMn in this order after each of a time zone corresponding to the field designated by "A(Mn)" illustrated in FIG. 9-1 and that corresponding to the field designated by "B(Mn-1)" illustrated in FIG. 9-2.

(c) Third Example

Figure 10A:
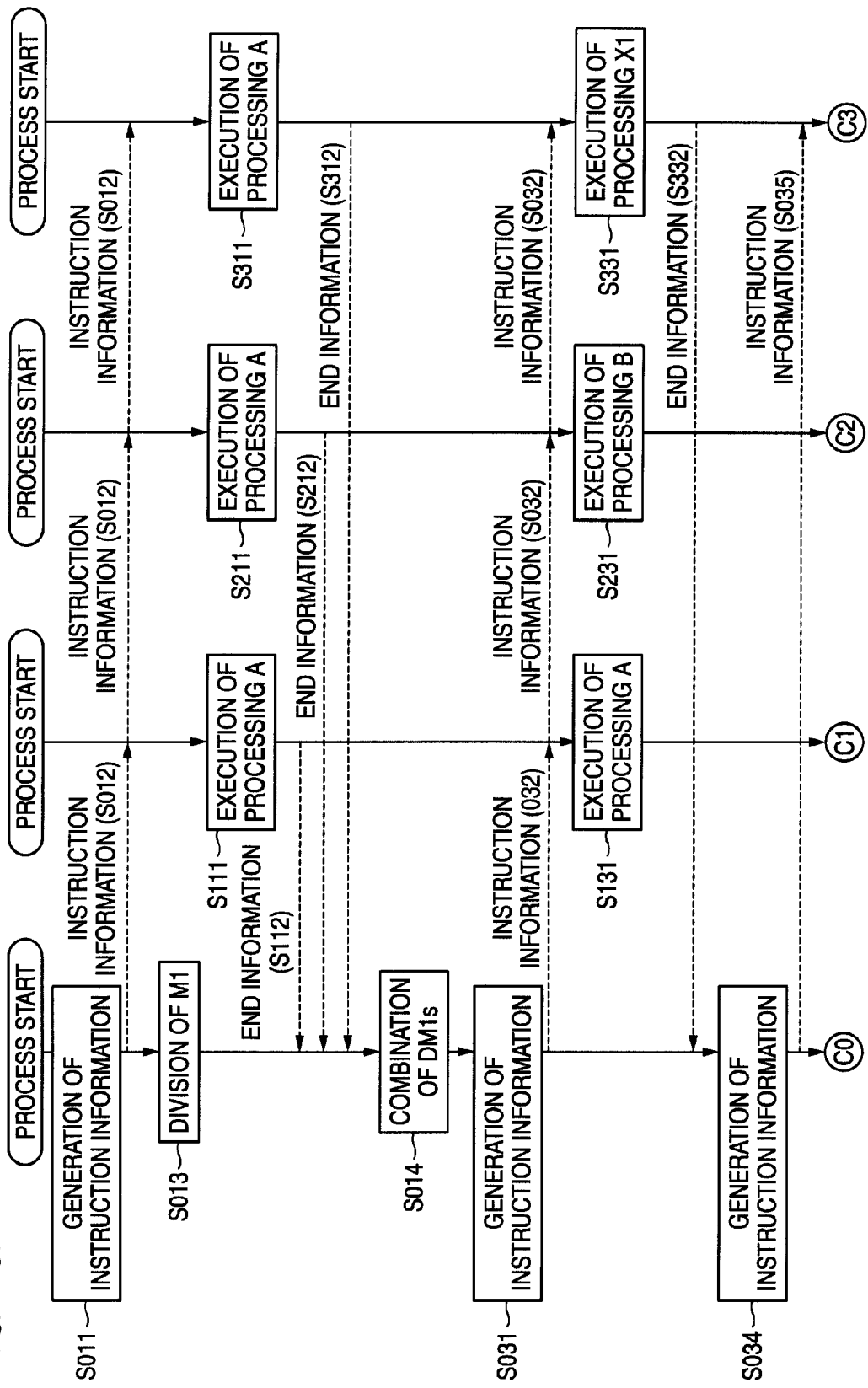
FIG. 10A is a sequence diagram illustrating pre-combination image data processing according to a third example of the invention.
Figure 10B:
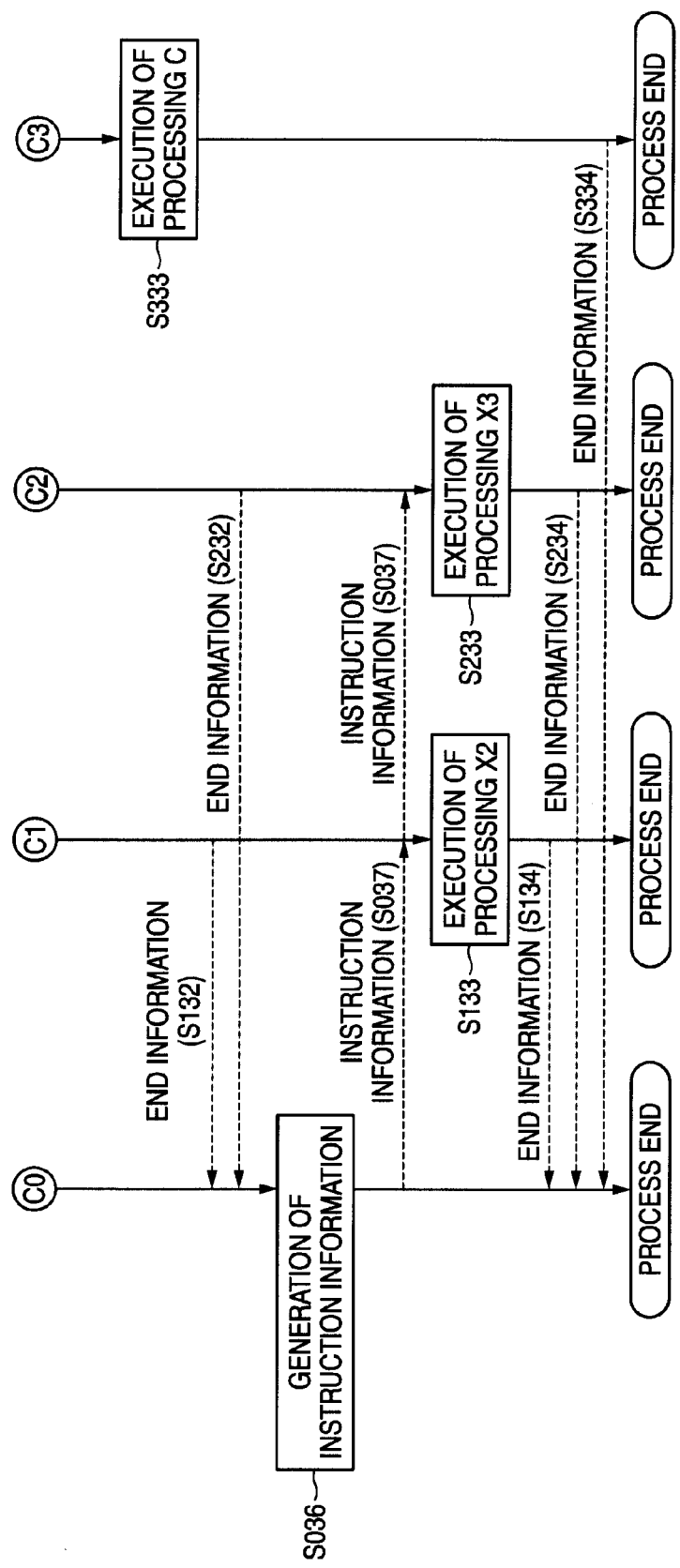
FIG. 10B is a sequence diagram illustrating the pre-combination image data processing according to the third example.
Figures 1, 11:
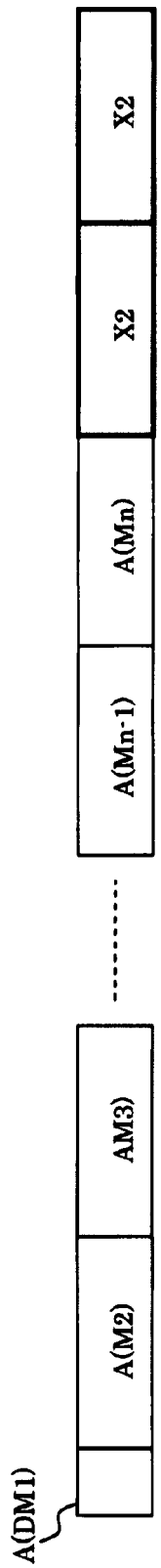
Figures 2, 11:
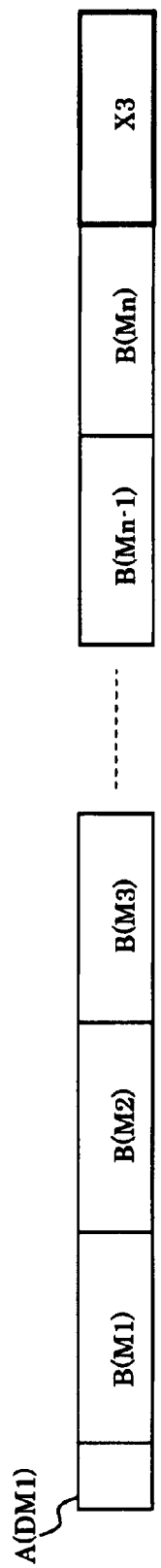
Figures 3, 11:
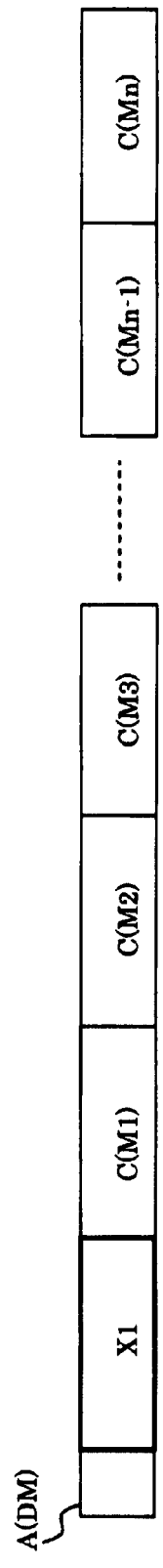

FIGS. 10A and 10B show sequence diagrams each illustrating pre-combination image data processing according to a third example of the invention. Encircled characters C0 to C3 illustrated in FIG. 10A mean that a process is connected from a point designated by each of the encircled characters to a point designated by the same encircled character C0, . . . , or C3 in a process illustrated in FIG. 10B. Processing in steps designated by reference numerals of S000s in FIGS. 10A and 10B is that to be performed by the local host unit 44. Processing in steps designated by reference numerals of S100s, that in steps designated by reference numerals of S200s, and that in steps designated by reference numerals of S300s correspond to that to be executed by the dynamically reconfigurable processor 30-1, that to be executed by the dynamically reconfigurable processor 30-2, and that to be executed by the dynamically reconfigurable processor 30-3, respectively. FIGS. 11-1 to 11-3 are processing diagrams illustrating the third example. More specifically, FIGS. 11-1 to 11-3 are processing diagrams each illustrating a process performed by an associated one of the dynamically reconfigurable processors 30-1 to 30-3. Hereinafter, pre-combination image data processing according to the third example is described with reference to FIGS. 4, 10A, 10B, and 11. In these figures, the same processing as in FIG. 8 is designated by the same reference numeral. The description of such processing is omitted.

In this example, the dynamically reconfigurable processors 30-1 to 30-3 perform processing A on the processing-unit data-element M1 by taking partial charge of the processing A, similarly to the second example. At that time, the dynamically reconfigurable processor 30-3 executes processing X1 that is not included by the pre-combination image data processing, while waiting for the transfer of the processing-unit data-element M1, on which processing B is performed, from the dynamically reconfigurable processor 30-2. The dynamically reconfigurable processor 30-1 executes processing X2 that is not included by the pre-combination image data processing, while the other dynamically reconfigurable processors execute processing after processing A performed on the processing-unit data-element Mn is finished. In addition, the dynamically reconfigurable processor 30-2 executes processing X3 that is not included by the pre-combination image data processing, while the other dynamically reconfigurable processor 30-3 executes processing C after processing B performed on the processing-unit data-element Mn is finished.

These types of processing X1 to X3 executed by the operational processing unit 20, processing can be part of processing to be executed by the operational processing unit 20, such as compression of history information of processing to be performed by the operational processing unit 20. In this case, the dynamically reconfigurable processors executing such types of the processing X1 to X3 acquire, from the operational processing unit 20, data necessary for performing processing, based on processing by the local host unit 44 and the operational processing unit 20. Then, the dynamically reconfigurable processors output data obtained by performing such types of processing X1 to X3 to the operational processing unit 20, based on the processing performed by the local host unit 44 and the operational processing unit 20.

In step S011, the local host unit 44 generates instruction information indicating that the dynamically reconfigurable processors 30-1 to 30-3 should perform processing A on the processing-unit data-element M1 by taking partial charge of the processing A. In step S012, the local host unit 44 notifies the dynamically reconfigurable processors 30-1 to 30-3 of the generated instruction information.

When receiving a notification representing the instruction information, the dynamically reconfigurable processors 30-1 to 30-3 perform processing A on the processing-unit data-element M1 by taking partial charge of the processing A. In steps S112, S212, and S312, the dynamically reconfigurable processors 30-1 to 30-3 notify the local host unit 44 of end information after executing the processing A by taking partial charge of the processing A.

When receiving notifications representing the end information, in step S014, the local host unit 44 generates a single processing-unit data-element M1 by combining the processing-unit data-elements DM1 respectively transferred from the A-processing circuits. Then, the local host unit 44 transfers the processing-unit data-element M1 to the dynamically reconfigurable processor 30-2.

In this process, the local host unit 44 starts performing processing in step S011. The processing indicated by each of the fields A(DM1) respectively illustrated in FIGS. 11-1 to 11-3 is executed until the local host unit 44 finishes the processing performed in step S014.

In step S031, the local host unit 44 generates instruction information indicating that the dynamically reconfigurable processors 30-1 and 30-2 should continue to perform pipeline processing on the processing-unit data-elements M1 to Mn. In step S032, the local host unit 44 notifies the dynamically reconfigurable processors 30-1 and 30-2 of the instruction information. On the other hand, in step S031, the local host unit 44 generates instruction information indicating that the dynamically reconfigurable processor 30-3 should execute processing X1. Then, in step S032, the local host unit 44 notifies the dynamically reconfigurable processor 30-3 of the instruction information.

In step S131, the dynamically reconfigurable processor 30-1 performs processing A on the processing-unit data-elements M2 to Mn. In step S231, the dynamically reconfigurable processor 30-2 performs processing B on the processing-unit data-elements M1 to Mn.

On the other hand, in step S331, the device control unit 36 provided in the dynamically reconfigurable processor 30-3 configures, in the circuit configuring device 40, a circuit for executing the processing X1. Then, this device control unit 36 causes the configured circuit to execute the processing X1. Upon completion of the processing X1, in step S332, the device control unit 36 provided in the dynamically reconfigurable processor 30-3 notifies the local host unit 44 of end information.

When receiving a notification representing the end information, in step S034, the local host unit 44 generates instruction information indicating the dynamically reconfigurable processor 30-3 should perform processing C on the processing-unit data-elements M1 to Mn. In step S035, the local host unit 44 notifies the dynamically reconfigurable processor 30-3 of the generated instruction information. The device control unit 36 provided in the dynamically reconfigurable processor 30-3 configures the C-processing circuit in the circuit configuring device 40. Then, in step S333, the local host unit 44 causes the C-processing circuit to perform processing C on the processing-unit data-elements M1 to Mn transferred from the dynamically reconfigurable processor 30-2.

Upon completion of performing processing A on the processing-unit data-elements M2 to Mn, in step S132, the dynamically reconfigurable processor 30-1 notifies the local host unit 44 of end information indicating the completion of the execution of the processing A. Upon completion of performing processing B on the processing-unit data-elements M1 to Mn, in step S232, the dynamically reconfigurable processor 30-2 notifies the local host unit 44 of end information indicating the completion of execution of the processing B.

In this process, in a time-period since the local host unit 44 starts processing in step S031 and until the local host unit 44 receives the notifications of end information in steps S132 and S232, processing is performed, which corresponds to each of fields A(M2) to A(Mn) illustrated in FIG. 11-1 and fields B(M1) to B(Mn) illustrated in FIG. 11-2. In a time-period since the local host unit 44 starts processing in step S031 and until the local host unit 44 receives the notification of end information in step S334, processing corresponding to each of a field X1 and fields C(M1) to C(Mn) illustrated in FIG. 11-3 is performed.

When receiving notifications representing the end information, in step S036, the local host unit 44 generates instruction information indicating that the dynamically reconfigurable processor 30-1 should execute processing X2, and instruction information indicating that the dynamically reconfigurable processor 30-2 should execute processing X3. In step S037, the local host unit 44 notifies each of the dynamically reconfigurable processors 30-1 and 30-2 of the associated instruction information. The device control unit 36 provided in the dynamically reconfigurable processor 30-1 configures, in the circuit configuring device 40 provided therein, a circuit for executing processing X2. Then, in step S133, this device control unit 36 causes the configured circuit to execute the processing X2. The device control unit 36 provided in the dynamically reconfigurable processor 30-2 configures, in the circuit configuring device 40 provided therein, a circuit for executing processing X3. Then, in step S233, this device control unit 36 causes the configured circuit to execute the processing X3.

Upon completion of execution of the processing X2, in step S134, the device control unit 36 provided in the dynamically reconfigurable processor 30-1 notifies the local host unit 44 provided therein of the completion of execution of the processing X2. Upon completion of execution of the processing X3, in step S234, the device control unit 36 provided in the dynamically reconfigurable processor 30-2 notifies the local host unit 44 provided therein of the completion of execution of the processing X3. Upon completion of performing processing C on the processing-unit data-elements M1 to Mn, in step S334, the device control unit 36 provided in the dynamically reconfigurable processor 30-3 notifies the local host unit 44 provided therein of the completion of performing the processing C. When receiving the notifications representing the end information, the local host unit 44 finishes all types of processing including the pre-combination image data processing and the processing X1, the processing X2, and the processing X3.

In this process, in a time-period since the local host unit 44 starts processing in step S036 and until the local host unit 44 receives the notifications of end information in steps S134, S234 and S334, processing is performed, which corresponds to each of a field X2 illustrated in FIG. 11-1 and a field X3 illustrated in FIG. 11-2. That is, in a data waiting time caused in a process in which the pre-combination image data processing is performed, processing other than the pre-combination image data processing is executed. Consequently, hardware resources are effectively utilized.

Similarly to the first example, the dynamically reconfigurable processors 30-1 and 30-2 can perform the processing B and the processing C in this order on the processing-unit data-element Mn by taking partial charge of each of the processing B and the processing C, instead of respectively executing processing X2 and processing X3. In this case, the dynamically reconfigurable processors 30-1 and 30-2 performs the processing B and the processing C in this order by taking partial charge of each of the processing B and the processing C on the processing-unit data-element Mn, while the dynamically reconfigurable processor 30-3 performs processing C on the processing-unit data-element Mn-1.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image data processing apparatus comprising:
 a first operational processing circuit;
 a second operational processing circuit;
 a third operational processing circuit, each of the first operational processing circuit, the second operational processing circuit, and the third operational processing circuit being configured to have a variable circuit configuration and to execute operational processing on image data; and
 a control section that controls the first to third operational processing circuits to execute one of a plurality of types of operational processing performed on the image data in a predetermined order,
 wherein the control section is configured to:
  configure the first operational processing circuit, the second operational processing circuit, and the third operational processing circuit so that, at a first point in time, the first operational processing circuit executes a first type of operational processing, the second operational processing circuit executes a second type of operational processing and the third operational processing circuit executes a third type of operational processing;

configure the first operational processing circuit, the second operational processing circuit and the third operational processing circuit so that, at a second point in time, the first operational processing circuit and the second operational processing circuit execute the second type of operational processing by dividing a processing-unit data-element of the image data and the third processing circuit executes the third type of operational processing; and configure the first operational processing circuit, the second operational processing circuit and third operational processing circuit so that, at a third point in time, the first operational processing circuit and the second operational processing circuit execute the third type of operational processing by dividing the processing-unit data-element of the image data and the third operational processing circuit executes the third type operational processing.

2. The image data processing apparatus according to claim 1, wherein in response the image data being interrupted in the first operational processing circuit configured to execute the first type of operational processing, the control section configures the first operational processing circuit to execute the second type of operational processing.

3. The image data processing apparatus according to claim 1, wherein the first operational processing circuit and the second operational processing circuit are dynamically reconfigurable.

* * * * *